(12) United States Patent
Harding

(10) Patent No.: US 6,324,969 B1
(45) Date of Patent: Dec. 4, 2001

(54) PEELER FOR FRUITS AND VEGETABLES

(75) Inventor: Gary John Harding, Scarness (AU)

(73) Assignee: Univex Corp., Salem ( * ) Notice: Subject to any disclaimer, the term of this patent is extended or adjusted under 35 U.S.C. 154(b) by 0 days.

(21) Appl. No.: 09/573,310

(22) Filed: May 18, 2000

(51) Int. Cl.[7] .............................. A23N 7/00; A47J 17/00
(52) U.S. Cl. ........................ 99/590; 99/589; 99/587; 99/584
(58) Field of Search .................... 99/542, 541, 540, 99/544, 551, 564, 584, 587, 589, 590, 594, 585, 588

(56) References Cited

U.S. PATENT DOCUMENTS

| | | | |
|---|---|---|---|
| 1,370,634 | * 3/1921 | Dowson | 99/589 |
| 1,430,124 | * 9/1922 | Stanley | 99/590 |
| 1,615,304 | * 1/1927 | Korner et al. | 99/589 X |
| 5,598,773 | * 2/1997 | Hoffseth | 99/585 |

* cited by examiner

Primary Examiner—Reginald L. Alexander
(74) Attorney, Agent, or Firm—Cesari and McKenna

(57) ABSTRACT

An apparatus for removing skin from a convex surface of a section of fruit. The apparatus includes a substantially U-shaped peeling blade and a feeder which in use contacts and grips the fruit or vegetable at a location about opposite the apex of the peeling blade so as to urge the fruit past the peeling blade, characterized in that the apparatus also includes at least one guide for guiding the fruit past the peeling blade.

20 Claims, 7 Drawing Sheets

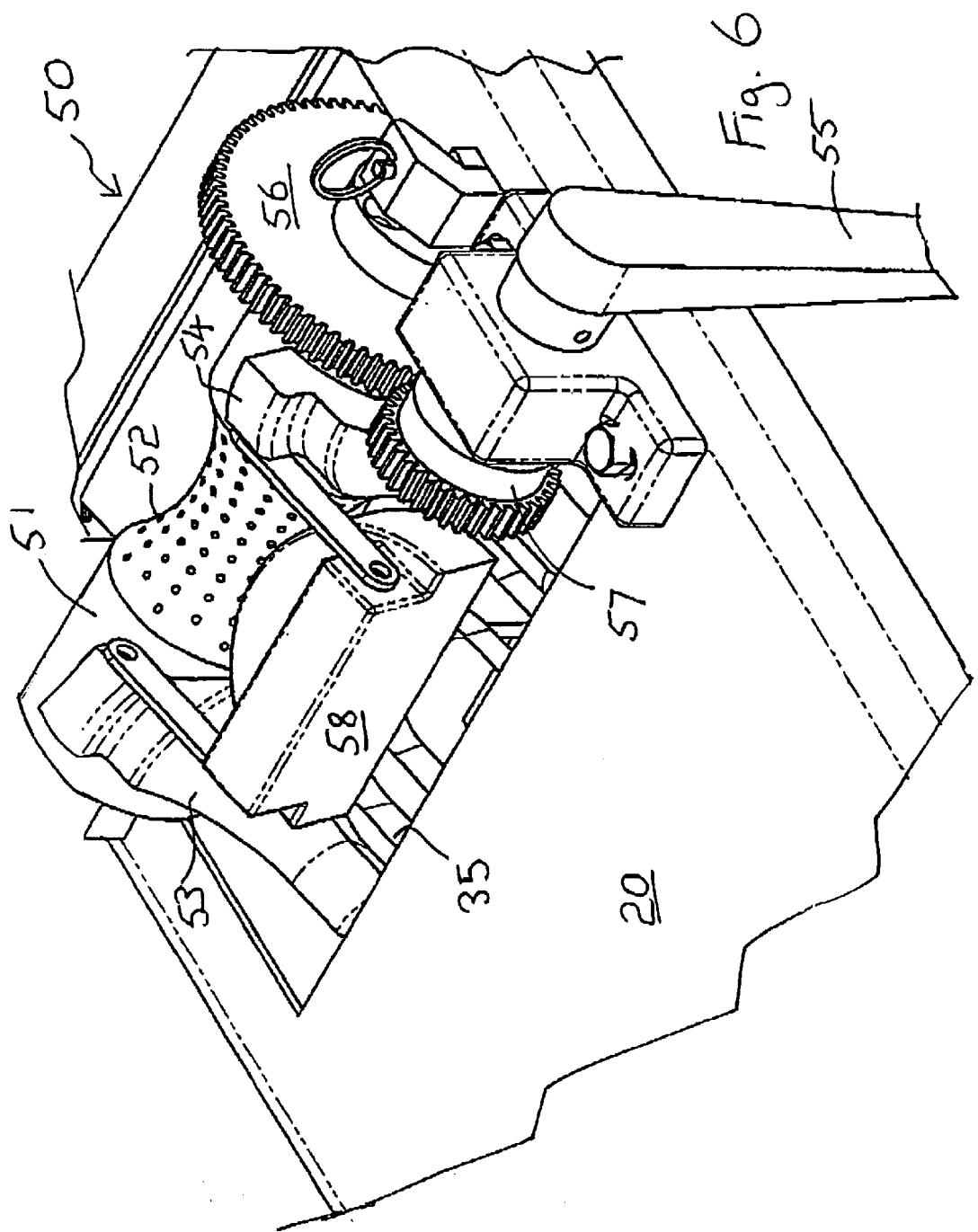

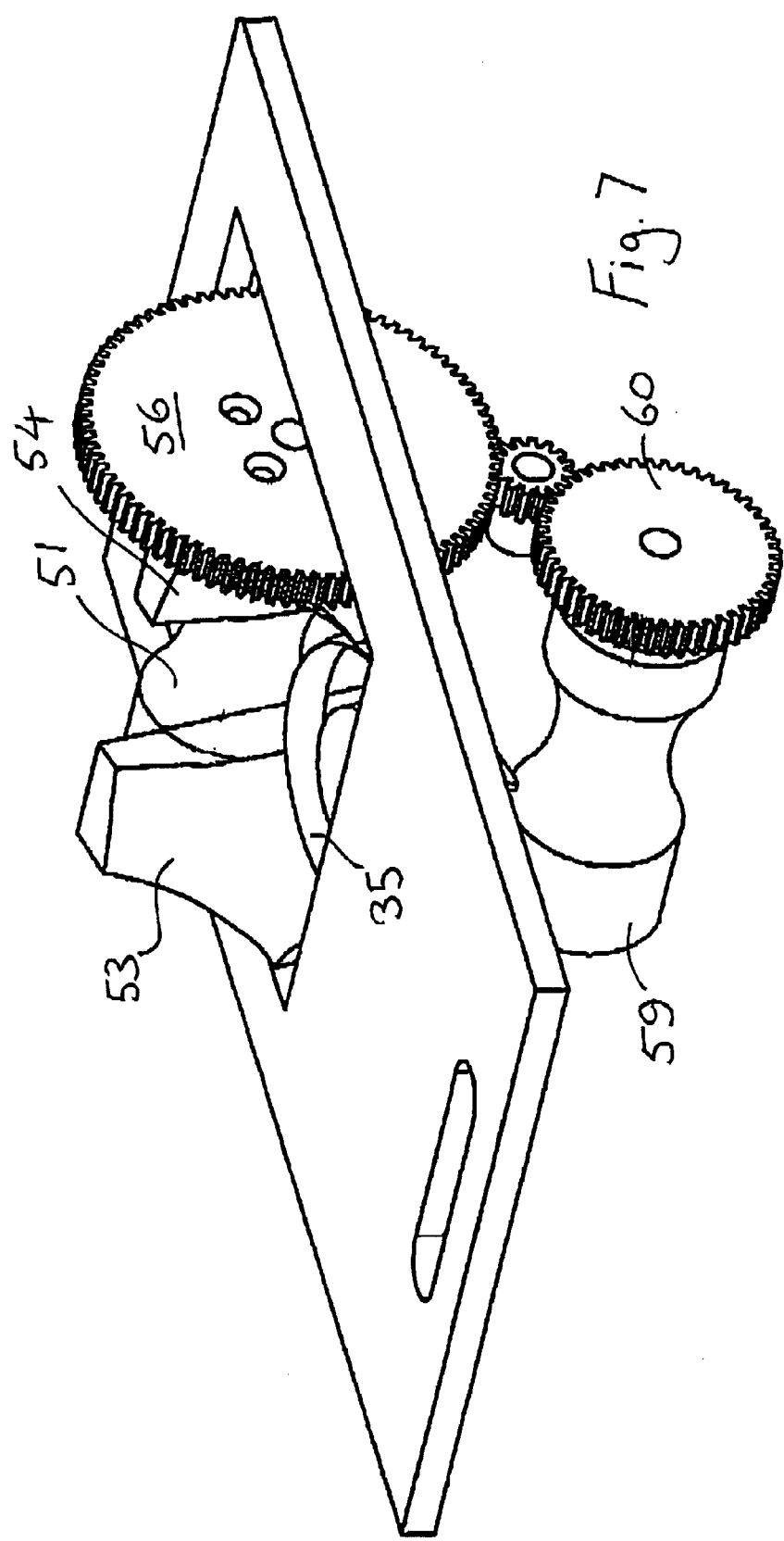

PEELER FOR FRUITS AND VEGETABLES

FIELD OF THE INVENTION

The present invention relates to an improved apparatus for peeling fruit or vegetables, and in particular to an apparatus for peeling melons.

BACKGROUND OF THE INVENTION

Machines which automatically peel stone fruit and in particular mangoes are known. An example of such a machine is described in Australian Patent No. 602073. This machine has a curved peeling blade, which conforms to the concave outer surface of the mango. The mango is first halved and seeded and then transported by conveyor belt towards the peeling blade. The mango is urged past the peeling blade by means of an overhead profiled belt. Slicing blades are associated with the curved blade to both slice the mango and to guide the mango half through the peeling blade. However, such an arrangement is unsuitable if it is desirable for the fruit to be peeled as a single piece rather than slices. For example, slices are typically unsuitable for further processing in dicing machines.

The distance through which the centerline of the fruit skin moves as it passes through the peeling blade is greater than the distance moved by the edges of the skin. However, the profiled belt and roller arrangement as described in AU602073 moves fastest at the edges of the skin and slowest at the centerline. In practice, this difference in travelling speeds causes uneven feeding of the fruit past the blade and/or jamming of the fruit in the machine. Another mmango peeling machine, described in Australian Patent No 621411, employs a similar curved peeling blade. However, a pair of counter rotating traction wheels are used to urge the mango past the blade. Each wheel has a rim profiled to conform to the shape of the peeling blade. The distance between the rim and the blade controls the peeling depth. The rims are adapted to grip the skin of a piece of mango, which is being fed by a conveyor toward the rotating wheels. When the mango reaches the wheels, it is gripped by the rims and urged downwards through the peeling blade. Use of the profiled rims enables the different speeds of the centerline and edges of the mango as it travels through the peeling blade to be accommodated.

The machines as described above are operated by electric motors which operate chain or belt drives. However, such drive systems are expensive to fabricate, install and align. Regular maintenance and servicing is also required. Further, after a period of time, the chain or belt and respective guides become worn and/or loose. In the case where the peeling machine has a pair of counter rotating wheels, the chain drive is subject to wearing and stretching. When such wearing and stretching occurs, the fruit may be gripped in an uneven manner by the wheel rims. This causes the fruit being to be fed to peeling blade in an uneven or skewed manner. This results in non-uniform peeling of the fruit.

Another disadvantage of the above machines, is that the size of the drive mechanisms require a relatively large housing. This means that the size of the machine prevents its application in the domestic kitchen or smaller spaces such as a restaurant or cafe. Another feature of the known machine which makes it unsuitable for these applications is that the drive mechanisms generate considerable noise.

OBJECT OF THE INVENTION

It is therefore an object of the present invention to provide an improved apparatus for peeling fruit or vegetables, which may at least partially overcome the above disadvantages or provide the public with a useful choice.

BRIEF SUMMARY OF THE INVENTION

According to a first broad form of the invention there is provided an apparatus for removing skin from fruit or vegetables, the apparatus including a substantially U-shaped peeling blade and a pair of gear wheels mounted for rotation and an outwardly extending fruit-gripping portion located on the face of each wheel, characterized in that when said wheels are rotated, the fruit-gripping portion of each respective wheel is able to grip the skin and urge the fruit or vegetable past the blade so as to remove the skin therefrom.

The apparatus of the present invention may be used for removing the skin of any suitable fruit or vegetable such as an eggplant or papaya. In particular the apparatus is suitable for peeling melons. In the present specification and claims, it will be understood that a reference to fruit also includes a reference to vegetables and no limitation is intended thereby. The apparatus may be used for peeling whole or precut sections of fruit. Typically, the apparatus removes skin from a fruit or vegetable half.

The apparatus of the present invention includes a U-shaped peeling blade. The peeling blade may be rigid or semi-rigid. The size of the blade typically corresponds closely to the size and shape of the fruit or vegetable to be peeled. It is preferred that the peeling blade is of a size and degree of curvature such that it can pass through the flesh at an optimum peel depth. A single apparatus may be used for peeling fruit or vegetables of different sizes through the ability to replace one peeling blade with a blade of a different length and/or degree of curvature.

The peeling blade is generally located on the same plane as the axis of the wheels. Typically the distance between the blade and the fruit-gripping portion corresponds to the depth of peel removed from the fruit. Preferably, this distance is able to be varied.

In some cases it may be desirable for the peeled fruit to have a decorative surface. In this case, the peeling blade may have an uneven or zigzagged edge.

Typically, a fruit half is fed toward the peeling blade in a horizontal or in a slightly downward direction. The fruit may be fed by any suitable means, e.g., manually or via a conveyor belt. As the fruit half approaches the blade, the cut surface facing downwards, the fruit meets the counter-rotating wheels and is forced to change direction such that it passes downwards through the peeling blade. In order to provide a uniform cut it, is preferred that the fruit describes an arc as it peeled. In order to facilitate such arcuate passage, it is preferred that the peeling blade has a convex cutting face. Fruit or vegetables which have been cut into segments such as thirds or quarters may also be peeled in accordance herewith. Typically the cut section is fed towards the blade on a V-shaped feeding plate. Whole fruit or vegetables, such as eggplant, may be peeled by passing the fruit or vegetable through the peeling blade twice.

The apparatus may further include an inner curved blade concentric with the peeling blade. In use, the inner blade can separate the seed sac or seed of a cut section of a fruit or vegetable.

The apparatus of the invention also includes a pair of gear wheels. The gear wheels typically have a 1:1 ratio and have an outwardly extending fruit-gripping portion which contacts and grips the fruit skin. The fruit-gripping portion is typically profiled such that there is a uniform gap between the fruit-gripping portion and the blade. This gap defines the peel depth. The fruit-gripping portion of each wheel typically extends from a point opposite the apex of the peeling blade and follows the curve of the peeling blade. In one form of the invention, the fruit-gripping portion does not follow along the full curvature of the peeling blade. In this case, the apparatus may further include at least one guide for guiding the fruit being peeled past the outer part of the curved section of the peeling blade. Typically the distance between the guide and the peeling blade is constant and is essentially the same as the distance between the fruit griping portion and the peeling blade. In this manner a constant peeling depth may be obtained.

The guide may form part of or be separate from the respective wheels. In one form of the invention the wheels have an outwardly extending front face, curved to follow the contour of the curved section of the peeling blade. That part of the front face adjacent the wheel rim may be provided with gripping means such as pins or the like for gripping the fruit skin. The part of the front face which is closest to the rotational axis of the wheel and which is not provided with gripping means may function as the guide.

Alternatively the guide may be separate from the wheel. In this case, the apparatus typically has at least one pair of opposing guides, located opposite the outer or widest part of the peeling blade. The pairs of guides may be fixed or may be mounted for rotation such that they rotate as the fruit is guided thereby. In this form of the invention, the apparatus may include at least one pair of opposing concave idler rollers. Where the guides are fixed they typically have a concave section which conforms to the curvature of the relevant section of the peeling blade. Fixed guides are typically provided with a low-friction surface so as to allow the fruit to slide past. The low-friction surface may be provided by any suitable means such as a high degree of polish or coating the guide with a low-friction plastics material. An advantage of having separate guides is that the wheels may be manufactured to have a smaller diameter. This can allow the total size of the machine to be reduced.

The guide or guides may in some cases, partially grip the fruit, however any such grip will typically be less than that of the gripping portion.

The gear wheel and front fruit-gripping portion may be integrally formed. Alternatively the fruit-gripping portion may be formed separately. The fruit-gripping portion may be attached to the gear wheel and mounted to the shaft. The fruit-gripping portion and gear wheel may also be separately mounted to the shaft. The fruit-gripping portions may thus be interchangeable to accommodate different fruits or fruits of different sizes.

The gear wheel may be made from any suitable material. Preferably the gear wheels and teeth are integrally molded from a food-grade thermoplastic material. Preferably the plastic material and tooth profile are selected to minimize operational noise.

The front fruit-gripping portions of the wheels may be roughened, textured and/or include a number of gripping projections such as teeth, studs or pins. In a preferred form of the invention, the projections on wheels having a profiled gripping portion are at right angles to the curved face of the griping portion. In this case the projections can grip the skin at an angle. The projections may also be curved inwardly to facilitate a grabbing action with the fruit skin. The nature of the projections, for example whether they are flat ended or pointed and the number, distribution and length may be varied as desired to accommodate fruits and vegetables having skins of different thickness and strength.

Typically, gripping pins or teeth are of a length such that they extend about half the distance between the wheel face and the peeling blade. In addition to these half length pins, a number of longer pins which extend almost fully out to the blade surface such that in use they brush or almost brush the blade surface. These pins operate to clear any fruit which has "hung up" on the peeling blade.

The fruit may be fed to the wheels either by hand or on a conveyor belt. The gear wheels may be driven by any suitable means for driving a gear wheel. For example, the shaft of the driven gear wheel may be directly driven by an electric motor. Alternatively, the driven wheel may be driven by a worm gear meshing with the gear teeth of the gear wheel. The gear wheel may also be adapted for manual rotation. The drive shaft may be directly or indirectly attached to a handle or the like which may be manually rotated by a user. Alternatively, the gear wheel may be operated by a further gear wheel, which is adapted for manual operation.

The above arrangement enables the size of the machine to be reduced by enabling the bulky drive mechanism to be removed. However, in some circumstances such as small domestic kitchens, it is desirable to be able to decrease the overall size of the machine still further.

According to a second embodiment of the invention there is provided an apparatus for removing skin from fruit, the apparatus including a substantially U-shaped peeling blade and a feeder which in use contacts and grips the fruit or vegetable at a location about opposite the apex of the peeling blade so as to urge the fruit past the peeling blade, characterized in that the apparatus also includes at least one guide for guiding the fruit past the peeling blade.

The U-shaped peeling blade of this embodiment may be the same as described above. The feeder is typically a single feeding roller having a concave face. Alternatively, the feeder may include two counter rotating wheels, each having a gripping portion, similar to that described above. The wheels are typically meshed gear wheels, although the wheels may also be driven by a conventional belt drive.

The concavity of the face of the single feeding roller typically conforms to the curvature of the peeling blade such that there is a uniform distance between the roller and peeling blade. The single feeding roller grips and feeds the fruit past the peeling blade. The single feeding roller may include a gripping portion which is adapted to facilitate the grip on the fruit skin. This gripping portion may be roughened or textured or be provided with gripping teeth or projections. Typically, the gripping projections project from the single feeding roller at about right angles to the rotational axis. Typically, the gripping portion includes a plurality of gripping teeth or pins. The teeth or pins may also include a plurality of longer "clearing pins" as described with reference to the first embodiment. Typically the pins are mounted to the roller in a series of horizontal lines. Preferably, alternate lines of pins are staggered in the direction of rotation.

The gripping portion is typically symmetrical about a point opposite the apex of the peeling blade. The gripping portion on the concave face of the single feeding roller typically describes an arc having an angle of between about 40 and about 120°. The gripping portion can extend along the full face of the single roller. Alternatively, the gripping portion may only extend along the central section of the face of the single feeding roller, in which case the outer sections of the face can function as guides.

Alternatively, the at least one guide may be formed separately from the single feeding roller. The guide may be stationary or may be mounted for rotation. Where the guide is stationary it typically has a low-friction surface, similar to that described above with respect to the first embodiment.

The single feeding roller may be driven by any suitable means such as by an electric motor or manually. Typically, the single feeding roller is attached to a drive wheel which may be a gear wheel adapted for manual or electrical operation. Alternatively the drive wheel may be driven by a conventional belt or chain drive.

The apparatus of either the first or second embodiment may also include a support for supporting the fruit or vegetable at the end of the peeling action. It has been observed that in some cases, some types of fruit have a tendency to sag as they complete the peeling action. It is desirable for optimum peeling efficiency that the fruit or vegetable define a smooth arc as it is urged past the blade. This smooth movement may be interrupted if there is any sagging. Therefore in some cases, it may be desirable to provide a fruit or vegetable support guide located beneath the peeling blade for supporting and guiding the fruit or vegetable through the final peeling movement.

The support guide may include a stationary member having a curved low-friction surface which can receive a leading end of the peeled fruit or vegetable and guide the movement of the fruit or vegetable through the final peeling stage. Alternatively, the support guide may be mounted for rotation. The support guide may be an idler roller or may be operatively associated with the feeder such that the speed of rotation of the support guide is proportional to the feeding speed of the feeder. Where the feeder (whether a single feeding roller or a pair of counter-rotating wheels) is driven by a gear wheel, the support guide may be connected via a gear wheel to the drive wheel. The support guide may also assist in the feeding of the fruit or vegetable past the peeling blade. In this case, the face of the rotating support guide may be modified to provide a gripping surface. The surface may be textured or may include a plurality of gripping projections. The rotating support guide may be a concave roller. The curvature of the concave face being so as to conform to the curvature of the fruit or vegetable being peeled.

Alternatively or in addition to the support guide, either embodiment of the invention may further include a push member for pushing a fruit or vegetable through the final part of the peeling action, should the fruit or vegetable become "hung up" on the peeling blade and the flesh and fruit do not cleanly separate. Typically the push member is located above the feeder and is mounted for pivotal movement between and inoperative position and a pushing position. The base of the push member is typically routed so as to conform to the peeling blade. Typically, the push member can be manually pivoted between the pushing and inoperative positions such that it need only be used if an operator considers it to be necessary.

DESCRIPTION OF THE FIGURES

FIG. 6 is a schematic view of a further preferred apparatus of the second embodiment of the invention.

FIG. 7 is a further schematic view of a preferred apparatus of the second embodiment of the invention.

DETAILED DESCRIPTION OF THE PREFERRED EMBODIMENTS

Figure 1:
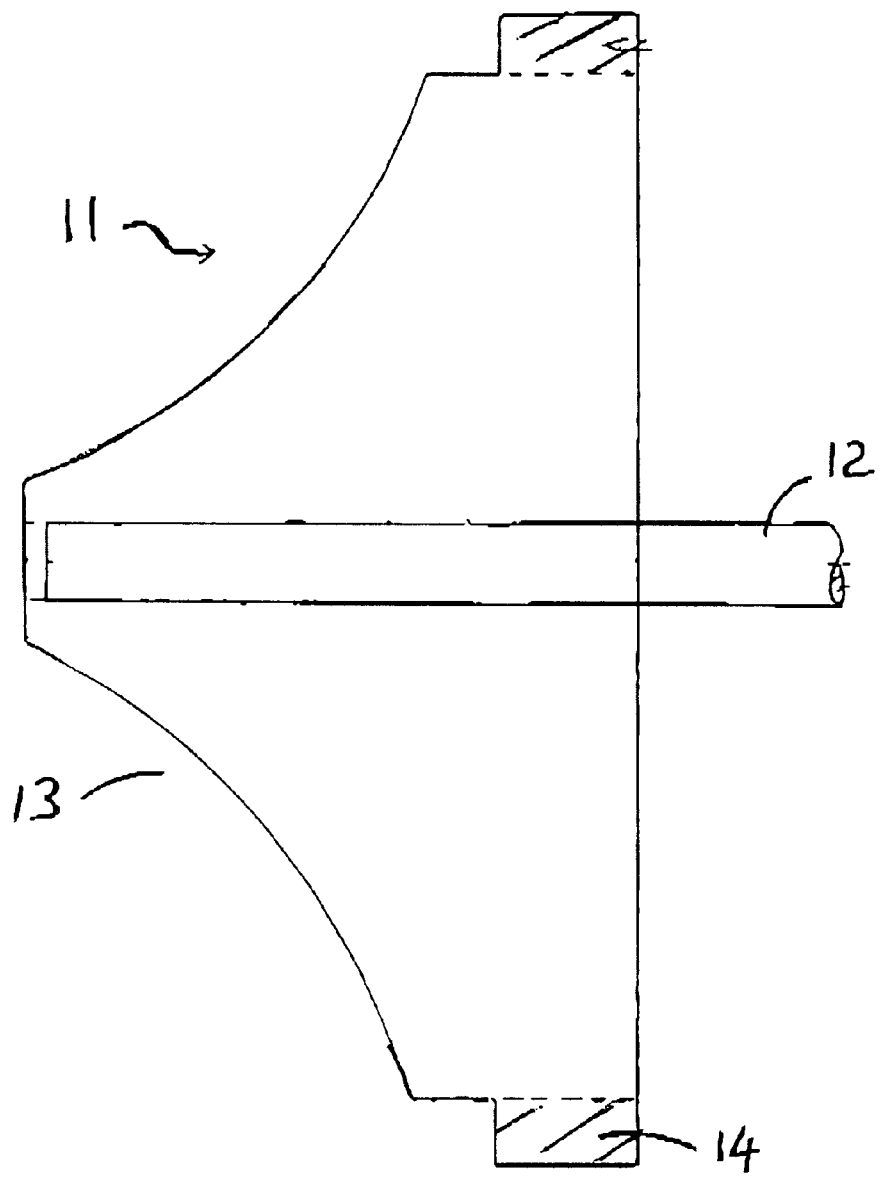
FIG. 1 illustrates a cross-sectional side view of a preferred gear wheel for use in a preferred apparatus of the present invention.

FIG. 1 illustrates the cross-section of a gear wheel 11 for use in a peeling apparatus of the present invention. The wheel 11 is attached to a shaft 12. This shaft is driven by an electric motor (not illustrated). The wheel has a frustoconical front face 13. The front face has a number of protruding stainless steel studs (not illustrated). The studs facilitate gripping of the fruit skin. The circumference of the wheel has a number of gear teeth 14. The wheel is formed by injection molding and the teeth are integrally molded. The stainless steel studs may be molded into the wheels during the injection molding process. The studs are preferably angled towards the fruit skin. The studs may also be at least partially curved towards the skin so as to facilitate the grip thereon.

Figure 2:
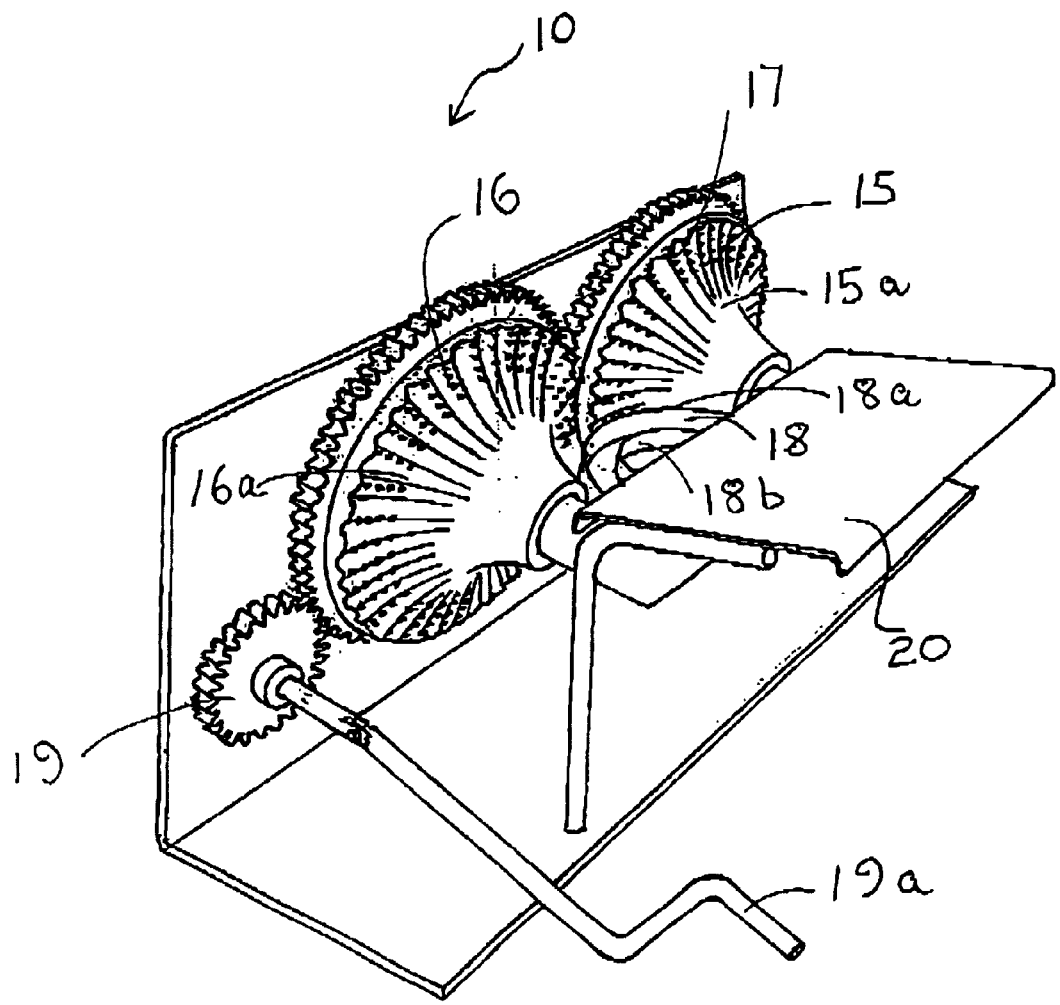
FIG. 2 illustrates a perspective view of a preferred apparatus of the present invention.

FIG. 2 illustrates a perspective view of a preferred apparatus 10 of the present invention. The apparatus includes a pair of gear wheels 15, 16. Each wheel has an outwardly extending frustoconical front face 15a, 16a. Each face has a plurality of radically aligned pins 17 extending from the base portion thereof. A curved peeling blade 18 is located between the wheels. The peeling blade has an outer blade 18a and an inner blade 18b. The plane of the peeling blade 18 is at about the same level as the line intersecting the axes of wheels 15, 16. The faces 15a, 16a are profiled such that in combination they conform to the curvature of the blade 18a. The distance between blade 18a and the curved faces corresponds to the depth of the skin to be cut away. This distance may be varied if desired. In use, the outer blade 18a cuts the skin from the fruit and the inner blade 18b separates the seed sac from the fruit flesh.

The wheels 15, 16 have a ratio of 1:1. This means that at the closest point between the two wheels, the circumference of each wheel is travelling in the same direction and at the same rotational velocity. This enables each wheel to grip opposing sides of the fruit skin at the same time and velocity. Thus, each side of the fruit can be uniformly pulled towards the peeling blade. This provides a cleaner cut and also prevents an asymmetric cut, uneven peeling or damage to the face of the peeled flesh.

The apparatus also includes a further gear wheel 19. This gear wheel is adapted to permit hand operated cranking of the wheels 15, 16 by rotation of handle 19a. The gear wheel 19 may also be driven by an electric motor. Alternatively, wheel 15 may have a set of female gear teeth molded into the rear face which receives a gear wheel.

Figure 3:
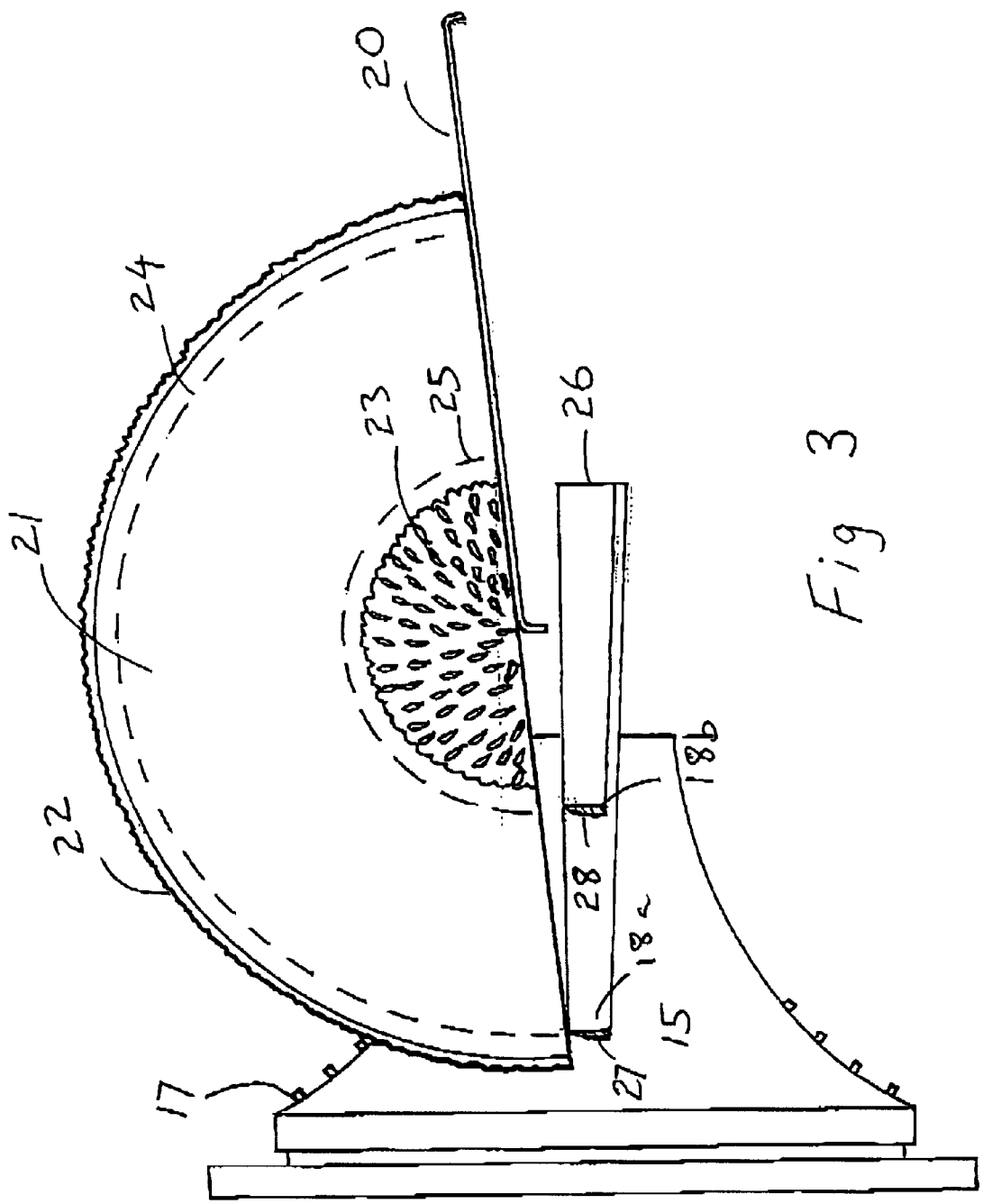
FIG. 3 illustrates a cross-section of the apparatus of FIG. 2 in use.

The apparatus further includes a flat feed plate 20 located in front of the gear wheels and at approximately the same level as the line extending horizontally between the line intersecting the axes of the wheels. FIG. 3 is a cross-section of the apparatus of FIG. 2 in use removing the skin 22 from a melon half 21. The melon half 21 is placed on the feed plate 20 and pushed towards the wheels 15, 16 by hand or other means. The pins 17 grab the melon at about the centerline thereof and force the melon though the peeling blades 18a and 18b so as to separate the skin and seed sac therefrom. Dotted lines 24, 25 indicate where the respective blades cut the melon. The blades taper away from the non-cutting edge. This tapered shape enables the blades to slice more easily through the fruit flesh than conventional non-tapered blades. The tapered outer faces 27, 28 of the blades have convex surfaces profiled to approximate the curvature of the passage of the fruit about the blade. This curvature further facilitates the scooping action of the blade through the flesh. Conventional peeling blades as described in AU 602073 are typically constructed from a rectangular length of stainless steel which has been bent to shape and the upper cutting edge sharpened. The present inventor has observed that such blades are prone to jamming of the fruit between the blade and the wheels. Such jamming in particular occurs towards the completion of the peeling cycle. The flat blade edge is attempting to slice through a fruit section of small radius. Often the flat blade edge catches the fruit at this stage. When jamming occurs it is necessary to cease rotation of the wheels and remove the jammed fruit manually. An optional chute (not illustrated) is provided beneath the blade to catch the peeled fruit. The chute is preferably placed to guide the peeled fruit section from the blade to a receiving chamber. The present inventor has observed that in the absence of a chute or other guiding means that towards the end of the peeling action, the weight of the fruit causes the fruit to bend under its own weight. Such bending may be minimized or avoided by provision of a chute or other guiding means. This may lead to a nonuniform cut or jamming of the fruit.

Figure 4:
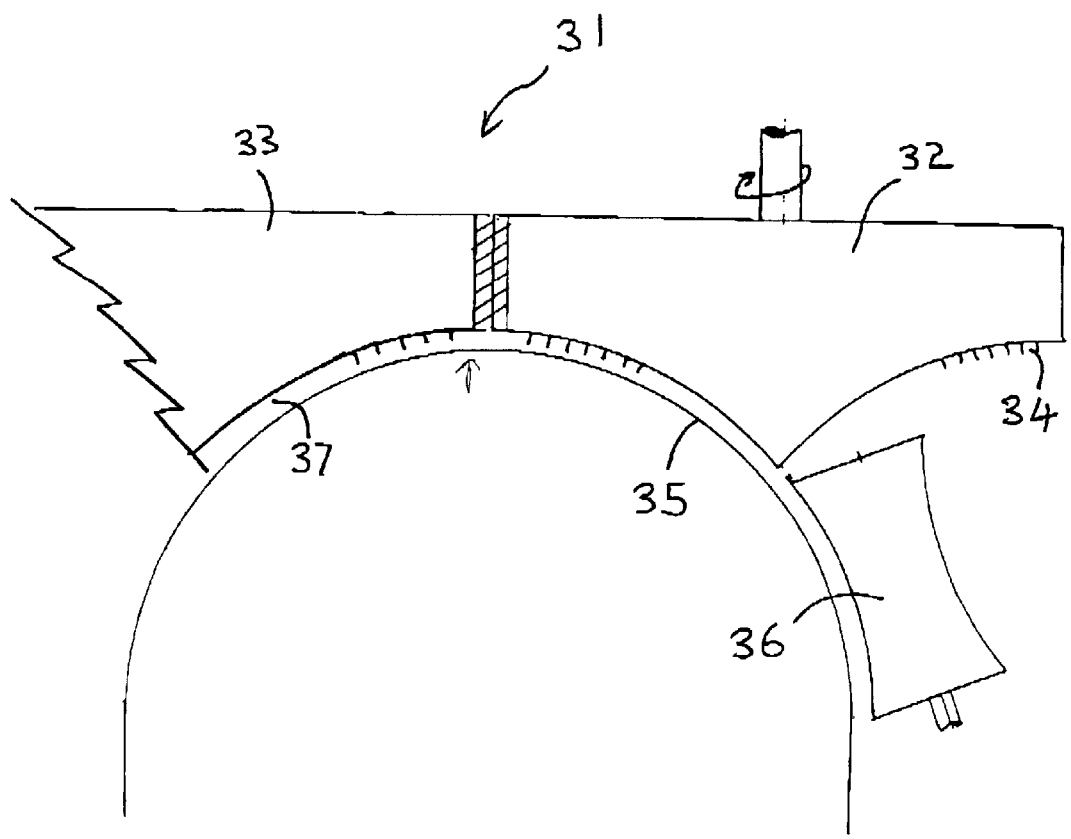
FIG. 4 illustrates a cross-sectional plan view of a further preferred apparatus of the present invention.

FIG. 4 is a plan view in cross-section of a further preferred apparatus 31 of the invention. The apparatus has a pair of gear wheels 32, 33. Each 15 gear wheel 32, 33 has a conical front face and studs 34 extending therefrom. The apparatus includes a curved peeling blade 35. The gear wheels are similar in shape and method of construction as that described above with reference to FIG. 1. The difference between the wheels 32, 33 are that wheels 32 and 33 are of a smaller diameter and the front face does not extend along the full length of the curved portion of the blade 35. This means that the shafts of the wheels may be placed closer together than otherwise possible.

The apparatus further includes a pair of guide rollers 36 located on either side of the blade (only one roller is illustrated). The guide roller 36 has an outer concave surface which is complimentary to the blade 35. The distance 37 between the guide roll 36 and the blade 35 and wheel 32 and the blade 35 is the same. This distance corresponds to the depth of the cut of the blade beneath the skin. The single roller 36 illustrated may be replaced by two or more rollers if desired.

In use a fruit half is urged towards the counter rotating wheels in a similar manner as described above. The studs 34 grab the skin and push the fruit past the blade 35. Only the center portion of the fruit is grabbed by the wheels. The edges of the fruit are guided past the blade by the rollers 36. The rollers are idle, which means that they can rotate at a speed corresponding to the relevant section of fruit skin. The speed at the rollers is slower than the speed of the center of the fruit. This ability of the guides to rotate at the same speed as the respective section of fruit minimizes the likelihood of the fruit jamming. Jamming may occur where the guides are stationary with respect to the movement of the fruit. In this way the slipping or skewing of the fruit is minimized or avoided.

It can be seen that by being able to reduce the size of the wheels the overall size of the apparatus may be significantly reduced.

Figure 5:
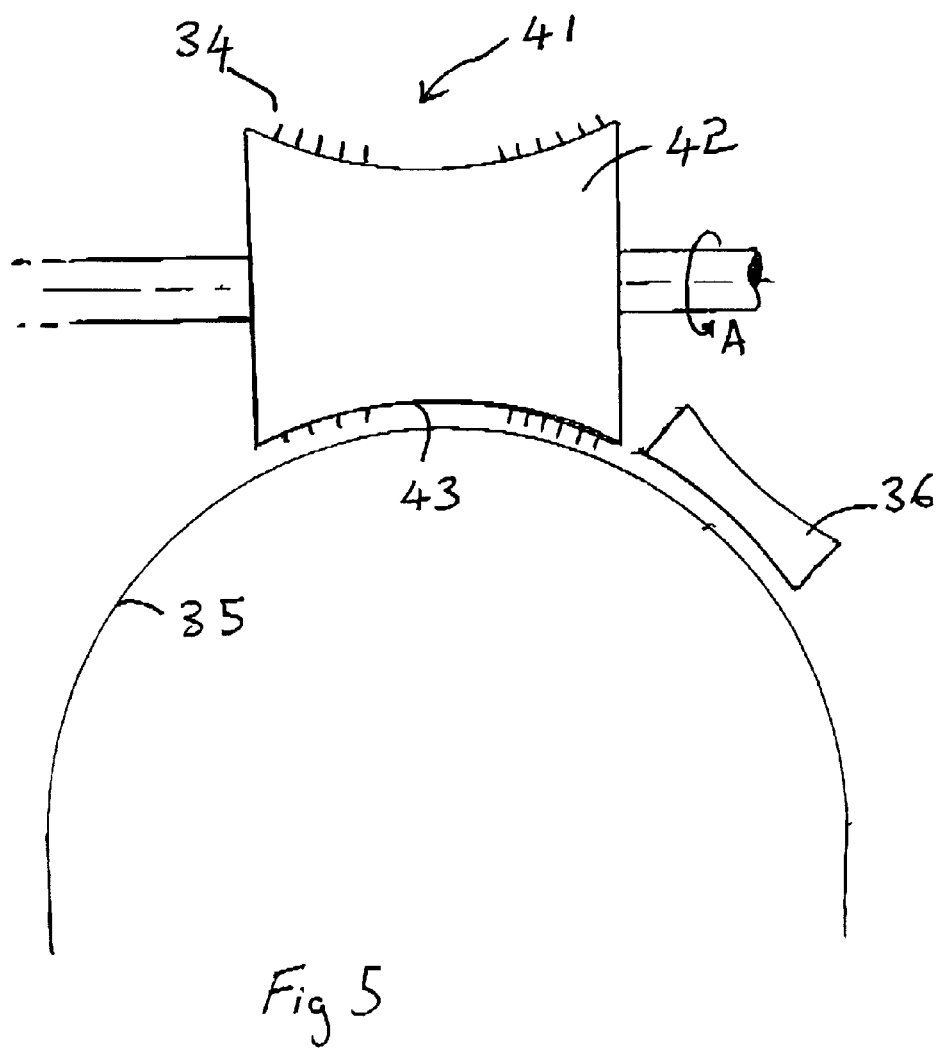
FIG. 5 illustrates a cross-sectional plan view of a preferred apparatus of the second embodiment of the invention.

FIG. 5 illustrates a further preferred apparatus 41 according to the second broad form of the invention. The apparatus includes a curved peeling blade 35 and opposed guide rollers 36 similar to that illustrated in FIG. 4. (Again only one roller is illustrated.) The two wheels have been replaced by a single curved roller 42, which rotates in the direction of arrow A. The roller 42 has a concave face 43 which is complementary to the curvature of the blade 35. The roller may be operated by an electric motor or by hand.

The apparatus operates in a manner similar to that described above in that the wheel grabs the fruit about its centerline and pushes it past the blade 35. The edges of the fruit are guided by the rollers 36. PIS the rollers rotate freely, they roll at the same speed as the fruit edges which is slower than the centerline of the fruit. In this way the fruit is not skewed or pulled and may be fed evenly over the blade.

FIG. 6 illustrates a further preferred apparatus 50 according to the second embodiment of the present invention. The apparatus 50 has a curved peeling blade 35 similar to that illustrated in FIG. 5, a feed plate 20 and a single concave roller 51. The curved portion of the roller is symmetrical about a line extending from the axis of the peeling blade. The angle described by the curve is between about 38 and 400 on either side of this line. At an angle of less than about 20° the fruit skin cannot generally be gripped sufficiently so as to provide a satisfactory feed. At angles greater than about 60° difficulties can arise due to uneven feeding caused by the different travel speeds of the various parts of the roller, i.e., the outer part of the roller with the greater diameter travels at a greater speed than the inner part of the roller with the smaller diameter. This different speed of travel is in conflict with the relative speed of the fruit skin which is fastest towards the center.

The roller 51 has a number of gripping pins 52 extending therefrom. The pins 52 are located in staggered horizontal lines. It has been observed that the staggering of the pins can avoid or minimize tearing of the fruit skin by the pins. The apparatus has a pair of opposed guides 53, 54. The guides have concave guiding faces which conform to the curvature of the peeling blade. The guide faces have low-friction surfaces which allow a piece of fruit to slide easily past and be guided past the peeling blade.

The roller 51 may be attached to a handle 55 via gearwheels 56,57 for manual operation. The apparatus 50 also includes a push member 58, pivotally attached to guides 53,54. The push member can be pivoted between a raised position to the illustrated lower position. The push member 58 has a hemispherical lower surface which is routed to provide grooves which can receive the edges of the peeling blade(s). In the event that the trailing end of a fruit or vegetable becomes caught or jammed at the end of the peeling motion the push member 58 can be pivoted 1 owards the position illustrated so as to push the fruit or vegetable past the peeling blade.

FIG. 7 illustrates a further variation of the apparatus of FIG. 6. The same reference numerals are used to describe the same features. The apparatus also includes a support guide roller 59. The support guide roller 59 is concave. The roller 59 can be rotated in response to operation of gearwheel 60. In this way the support guide roller 59 can receive the leading end of the peeled fruit and can guide the fruit through the curvature of the peeling action. This can minimize or avoid the trailing end of the fruit from being "hung up" on the peeling blade. The roller 51 may be attached to a handle for manual operation.

It can be seen that the preferred apparatus of the first embodiment has some advantages over the known chain-drive operated machines. First, the apparatus does not have a bulky chain drive. This enables the size of the housing for the device to be substantially reduced, facilitating manufacture of a fruit peeler suitable for use in a commercial or domestic kitchen area. This has hitherto been impossible with the earlier-known machines. Further, the apparatus of the present invention does not require the regular servicing and maintenance which was necessary for the chain drives. Further, chains have been observed to stretch after a period of use. When this occurs, there is an uneven rotation of the roller heads. This causes a significant increase in drive noise and also one half of the fruit is gripped momentarily before the other half and the fruit is unevenly fed to the blade. In the apparatus of the present invention in which the fruit is urged towards the blade by meshing gears, the problems of uneven feeding may be avoided.

The apparatus of the present invention may also conveniently be manufactured as a manually operated machine. A manually operated machine is suitable for use in a domestic kitchen. Preferably, the gear wheels are easily removable from the shafts to facilitate cleaning and storage. This enables the machine to be used for domestic or other uses where a full scale industrial or electrically powered machine is unsuitable.

The apparatus may also be manufactured in a smaller version which in some cases may be hand held or wall mounted. The smaller types of apparatus may be suitable for peeling smaller types of fruit such as kiwi fruit.

It can also be seen that the apparatus of the second broad form of the invention can enable the overall size of the apparatus to be reduced even further. The apparatus may use two smaller wheels (which need not be meshed), a single roller or conveyer. The apparatus also enables the driving mechanism to be simplified.

It should be appreciated that various other changes and modifications may be made to the embodiments described without departing from the spirit and scope of the invention.

What is claimed is:

1. An apparatus for removing skins from fruits or vegetables, the apparatus including (a) a substantially U-shaped peeling blade having an apex and a cutting edge, (b) a feeder for gripping a fruit or vegetable at a location about opposite the apex of the peeling blade, the feeder feeding the fruit or vegetable into said cutting edge and past the peeling blade, and (c) a guide for guiding the fruit across the cutting edge and then into the feeder.

2. The apparatus of claim 1, wherein the feeder includes a single concave roller opposed to the peeling blade at about the apex thereof.

3. The apparatus of claim 1, wherein the feeder includes a pair of counter-rotating wheels.

4. The apparatus of claim 1, further including an opposed pair of stationary guide members curved to conform to the shape of the peeling blade.

5. The apparatus of claim 4, wherein the guide members each have a low-friction surface.

6. The apparatus of claim 1, wherein the peeling blade has a convex cutting face.

7. The apparatus of claim 2, wherein the single concave roller is configured for manual rotation.

8. The apparatus of claim 7, further including a push member mounted for pivotal movement between an operative position for pushing fruit past the peeling blade and an inoperative position.

9. The apparatus of claim 2, further including a support guide member located below the peeling blade.

10. The apparatus of claim 2, wherein the feeder has a gripping portion having a plurality of gripping projections extending therefrom.

11. The apparatus of claim 10, wherein the feeder is rotated in a direction in order to draw the fruit or vegetable past the peeling blade, the gripping projections being staggered in the direction of rotation.

12. The apparatus of claim 11, wherein the gripping portion extends at an angle of between about 20 and 60° on either side of the center of the roller.

13. Apparatus for removing skins from the flesh of fruits or vegetables, said apparatus comprising
a peeling blade having a cutting edge;
a guide defining a plane and for guiding a fruit or vegetable in a first direction across said cutting edge, and
a feeder located on the opposite side of said peeling blade from the guide for gripping said fruit or vegetable at a location spaced opposite the peeling blade and feeding the fruit or vegetable in a second direction different from said first direction directly into said cutting edge and past the peeling blade so as to separate the skin from the flesh of the fruit or vegetable.

14. The apparatus defined in claim 13 wherein the peeling blade is curved with a convex face facing the feeder and a concave face, and the feeder is a roller with concave curvature that substantially conforms to that of the peeling blade.

15. The apparatus defined in claim 14 and further including a second curved blade having an edge and being spaced between the peeling blade and the guide, the edges of both blades defining a plane which is substantially parallel to the plane defined by the guide.

16. The apparatus defined in claim 14 wherein the convex face of the peeler blade is tapered.

17. The apparatus defined in claim 14 and further including at least one stationary guide member on the same side of the peeling blade as the feeder and extending below said cutting edge for guiding the cut fruit or vegetable past the peeling blade.

18. The apparatus defined in claim 17 wherein there is a pair of stationary guide members which oppose one another.

19. Apparatus for removing skins from the flesh of fruits or vegetables, said apparatus comprising
a curved peeling blade having a convex face, a concave face and a cutting edge defining a plane;
a concave rotary feed roller spaced opposite the convex face of the peeling blade for gripping a fruit or vegetable lying in said plane at a location spaced opposite the peeling blade and feeding said fruit or vegetable directly into said cutting edge and past the peeling blade to separate the skin from the flesh of the fruit or vegetable, and
at least one stationary guide member spaced opposite the convex face of the peeling blade and extending below said cutting edge for guiding the cut fruit or vegetable past the peeling blade.

20. The apparatus defined in claim 19 wherein there is a pair of stationary guide members which oppose one another.

* * * * *